United States Patent [19]

Gehrig et al.

[11] Patent Number: 4,938,977
[45] Date of Patent: Jul. 3, 1990

[54] PROCESS FOR THE PRODUCTION OF DECAFFEINATED TEA

[75] Inventors: Manfred Gehrig; Adrian Forster, both of Wolnzach, Fed. Rep. of Germany

[73] Assignee: Hopfen-Extraktrion HVG Barth, Raiser & Co., Fed. Rep. of Germany

[21] Appl. No.: 350,228

[22] Filed: May 11, 1989

Related U.S. Application Data

[63] Continuation-in-part of Ser. No. 121,946, Nov. 18, 1987, abandoned.

[30] Foreign Application Priority Data

Nov. 26, 1986 [DE] Fed. Rep. of Germany ....... 3640333
May 25, 1988 [DE] Fed. Rep. of Germany ....... 3817736

[51] Int. Cl.$^5$ ................................................ A23F 3/36
[52] U.S. Cl. .................................. 426/386; 426/597; 426/427
[58] Field of Search ......................... 426/427, 597, 386

[56] References Cited

U.S. PATENT DOCUMENTS

| | | |
|---|---|---|
| 3,065,077 | 11/1962 | Mishkin et al. ............... 426/386 X |
| 3,532,506 | 10/1970 | Rey et al. ..................... 426/386 X |
| 3,689,278 | 9/1976 | Carbonell ..................... 426/386 X |
| 3,997,685 | 12/1976 | Strobel ......................... 426/386 X |
| 4,069,351 | 1/1978 | Yano et al. .................... 426/386 X |
| 4,092,436 | 5/1978 | MacDonald et al. .......... 426/386 X |
| 4,130,669 | 12/1978 | Gregg ........................... 426/386 X |
| 4,167,589 | 9/1979 | Vitzthum, et al. ............. 426/386 X |

OTHER PUBLICATIONS

Brogle, $CO_2$ in Solvent Extraction Chemistry and Industry, Jun. 1982, pp. 385-390.

Primary Examiner—Joseph Golian
Attorney, Agent, or Firm—Omri M. Behr

[57] ABSTRACT

By the extraction with $CO_2$ at 60 to 150 bar and 20° to 70° C., an aroma enriched fraction is taken from the moistened black tea, said fraction being added again to already decaffeinated and dried tea. Decaffeination starts after the aroma fraction has been obtained by pumping carbon dioxide at a pressure of between 150 to 500 bar and a temperature of between 10° to 100° C. through a bulk moistened tea. The solvent charged with caffeine is passed over an adsorber or purified by reduction of density.

13 Claims, 3 Drawing Sheets

PROCESS FOR THE PRODUCTION OF DECAFFEINATED TEA

RELATED APPLICATIONS

This is a continuation-in-part application of copending application Ser. No. 07/121,946, filed Nov. 18, 1987 now abandoned.

FIELD OF THE INVENTION

The increasing reservations against caffeine, which used to be called "theine" causes a rising demand for black tea or green tea with a reduced caffeine content. The demand for decafeinated tea would be expected to rise substantially when the difference in taste the treated teas and the untreated teas is hardly noticeable. The problem of the production of a high quality decaffeinated tea is a serious one, because the tea to be treated is a finished product ready for use. Further treatment should at least not deteriorate the quality.

DISCUSSION OF THE PRIOR ART

The caffeine content is reduced by adding a solvent to previously moistened tea leaves. Subsequently, the tea is dried and either as much solvent as possible is removed, or the tea is subjected to a further aqueous extraction for the production of instant tea.

The use of methylene chloride (dichloromethane) as solvent has never been satisfactory, because a major portion of aroma and flavor was removed together with the caffeine. According to EU-PS 0 050 482, reduction of the loss of aroma has been attempted by saturating the methylene chloride with the tea constituents (except caffeine) before extraction. This application, published in 1984, that is to say, approximately two years prior to the priority date claimed herein, states at column 1, lines 41 to 43 that "the flavor profile of tea is very unstable particularly in the presenece of water".

Owing to both potential dangers to health and legislative measures against the use of methylene chloride for the decaffeination of tea, ethyl acetate is now used as a substitute (cf. *Food Chemical News*, Jul. 16, 1984, page 25). But this solvent, too, not only fails to meet a sufficient number of the expectations made for it, to be used for the production of a high quality product, but furthermore, the production plants must be explosion-proof.

From DE-PS 21 27 642, a process is known according to which the caffeine is removed from fermented black tea by a physiologically acceptable solvent; it is said that flavor and aroma are left completely unimpaired. For this purpose, in a first step the aroma substances are removed by means of a dry, supercritical (with respect to pressure and temperature) gas, preferably carbon dioxide. In a second step, the caffeine is likewise removed from the moistened tea by supercritical, water-saturated carbon dioxide. Finally, the dried tea is re-impregnated with the aroma removed in the first step by charging the gas stream at a supercritical pressure with the aroma separated previously, which is liberated in the tea by demixing or liquefying the gas. As a prominent feature, it is stressed that those constituents of the tea which are responsible for flavor and color, e.g., tanning agents flavines and rubigenes, are not extracted, i.e., they remain in the decaffeinated tea. For three out of the five steps of the process (extraction of the aroma, moistening, decaffeinating, drying, re-impregnation of aroma) viz. the first, third and fifth step, expensive high pressure vessels are required; furthermore, the tea has to be transferred to other vessels during the process. Regrettably, the ultimately desired aim is not achieved as comparative tests of taste and flavor demonstrate.

Further, the rather minor improvement in quality achieved by the re-impregnation of the aroma does not appear to justify the high cost; therefore, a further improvement, DE-PS 26 37 197 discloses a selective separation of the caffeine from the charged solvent. To achieve this end, the supercritical $CO_2$ charged with caffeine and other accompanying substances is separated from the caffeine and the accompanying substances not by a reduction of pressure but, rather by passing the charged $CO_2$ over an acidic ion exchanger which selectively absorbs the caffeine. A further improvement is achieved when the extraction becomes selective for caffeine by the use of liquid $CO_2$ as solvent (DE-OS 34 13 869).

Providing an economical process was the main object of two further processes, according to which the extraction is again effected with supercritical $CO_2$ and the adsorption of the caffeine is effected by the less selective activated carbon (DE-OS 33 39 181 and DE-OS 34 15 844).

The problem of impairing the aroma may be avoided by decaffeinating green tea before it is fermented into black tea (DE-OS 34 14 767), or by decaffeinating tea which, though fermented, has not yet been dried (EU-A- 0167 399). Both methods are similar to the decaffeination of coffee, where green beans are treated and flavor and aroma develop only by the following process of roasting. However, it is only in the countries of origin that these possibilities would be realized advantageously.

In DE 35 15 740 (Kilma, et al), $CO_2$ passes tea and active carbon. The adsorbent is distributed within the tea or alternatively small batches of both materials are arranged one after the other in flow direction. Short extraction periods are claimed.

From wet tea, aroma constituents are removed with a wet gas and impregnated to a tea to be rearomatized as claimed in DE 36 40 967 (Schutz).

In EU 0 264 484, natural products are decaffeinated with mixtures composed of $CO_2$ and $N_2O$. The amount of solvent is reduced with the progress of the decaffeination process.

All the methods described so far control combine the three requirements (use of a harmless solvent for extraction, little impairment of taste and flavor, dispensability of high pressure steps, i.e., low costs). In fact, such a combination of features is the subject of the invention. It is interesting to note that in "*Verfahrenstechnik*", No. 11, 1987, at page 28, central column, it is stated (translation) "the problem arising during the preparation of theine free tea is that the selective isolation of theine is impossible so that not only theine but flavors are removed." Thus, well after the priority date claimed herein, a technical publication in the art alleges that the type of separation as claimed cannot be carried out.

SUMMARY OF THE INVENTION

According to the invention, dealkaloidation, suitably decaffeination, is effected gently after removal of the aroma fraction in a manner known per se, however, the tea is previously moistened before the aroma fraction is removed. Thereby, it is possible to produce a fully satisfactory tea in a small number of different steps which, as far as taste and flavor are concerned, surprisingly surpasses all other tea samples produced according to different methods.

DESCRIPTION OF THE PREFERRED EMBODIMENTS

Figure 2:
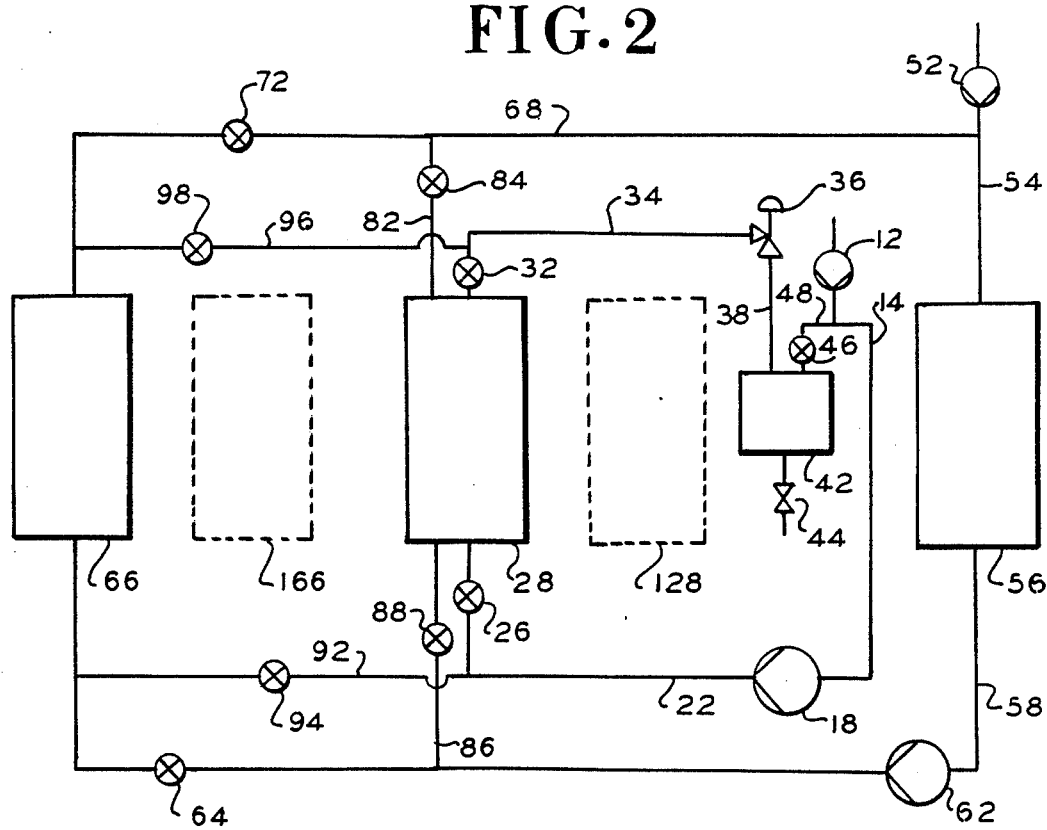
FIG. 2 is a schematic diagram showing a semi-continuous flow arrangement for carrying out the process of the present invention.

FIG. 2 shows an arrangement for a semi-continuous operation of the process of the present invention. This arrangement comprises two interchangeable and interconnected circuit systems. The primary circuit comprises an input pump 12 connected to high pressure line 14, joined at the other end thereof to liquified gas pump 18 which in turn is connected to first process tank 28 via high pressure line 22 containing valve 26.

First process tank 28 is connected to pressure regulator 36 via high pressure line 34 containing valve 32. Aroma separator tank 42 is connected to pressure regulator 36 via high pressure line 38 and to input pump 12 via high pressure line 48 which contains valve 46, it is also provided with a discharge valve 44.

The second circuit comprises input pump 52 connected to caffeine absorber 56 which in turn is connected to the second process tank 66 via high pressure line 58, which contains sequentially circulating pump 62 and valve 64. The circuit is completed by high pressure line 68 containing valve 72 connecting the second process tank 66 to high pressure line 54.

The interconnection between the circuits is provided by high pressure line 82 containing valve 84 which connects tank 28 to high pressure line 68 and high pressure line 86 containing valve 88 which connects tank 28 to high pressure line 58.

Similarly, high pressure line 92 containing valve 94 connects second process tank 66 to high pressure line 22 and similarly high pressure line 96 containing valve 98 connects tank 66 to high pressure line 34.

Figure 3A:
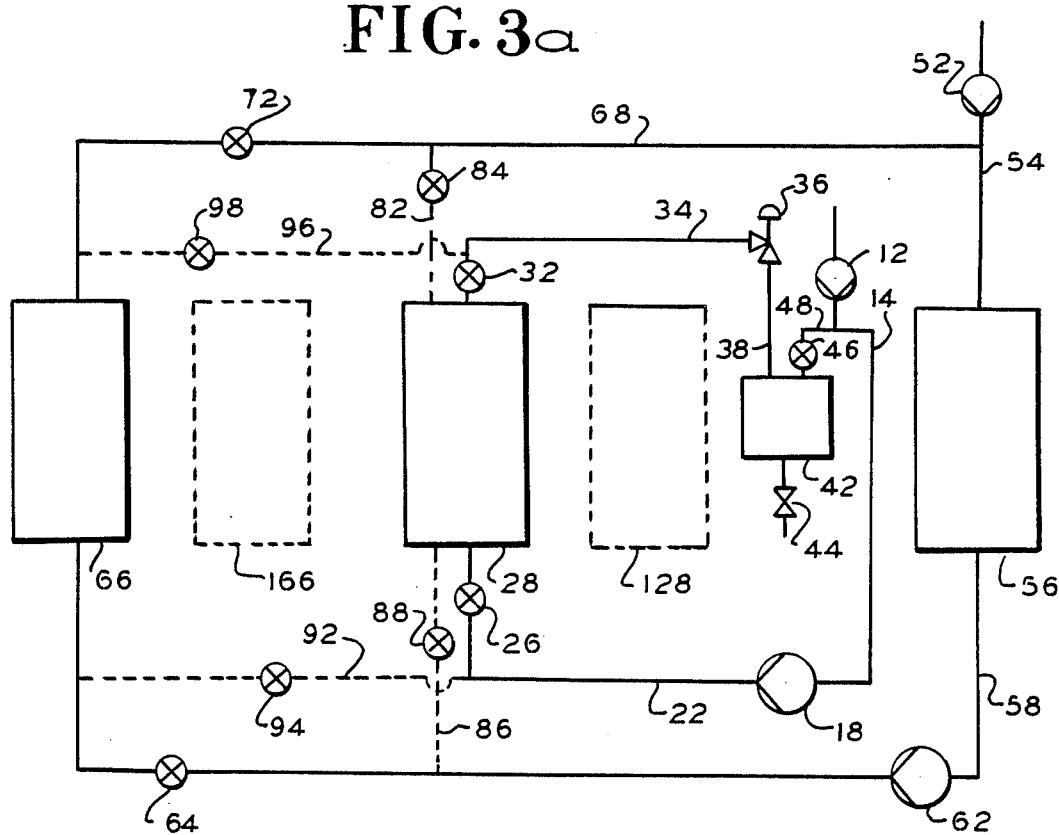
FIG. 3a shows the arrangement of FIG. 2 in the first cycle mode wherein aroma is extracted from fresh tea in a first process tank and the tea from which the aroma has already been extracted is decaffeinated in a second process tank. Unused flow lines are indicated in phantom.
Figure 3B:
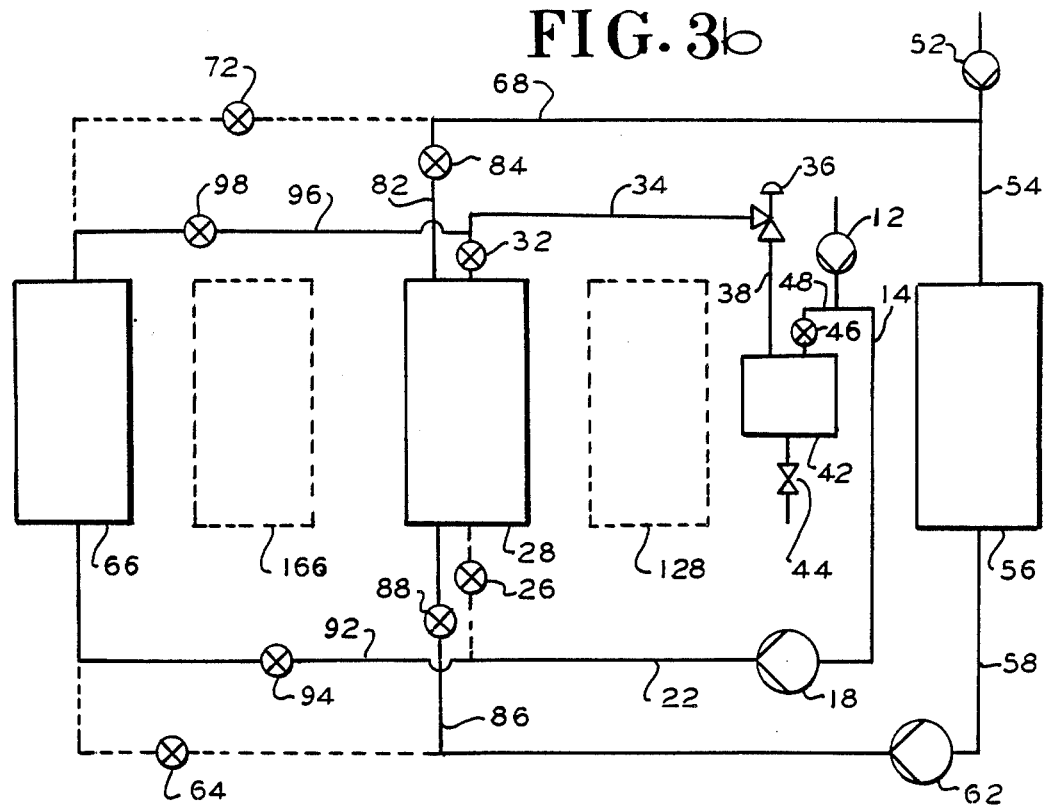
FIG. 3b shows the second cycle wherein aroma-free tea from the first cycle is decaffeinated in the first process tank and fresh tea is dearomatized in the second process tank. Similarly, unused flow lines are shown in phantom.

The process of the present invention is suitably carried out in two alternating cycles illustrated in FIGS. 3a and 3b respectively.

A shown in FIG. 3a fresh tea whose moisture content has been raised to a predetermined level, is charged to first process tank 28. Carbon dioxide at a predetermined pressure is pumped by input pump 12 into high pressure line 14 and circulated by liquified gas pump 18, through high pressure line 22 and open valve 26 to tank 28 where, under the given pressure and temperature conditions, it absorbs only moisture and aroma, but no caffeine. The $CO_2$ stream then passes via line 34 and open valve 32 into aroma separation tank 42, the pressure whereof is reduced by pressure regulator 36 whereby the content of tank 42 is split into three fractions, namely, a liquid aqueous phase, a liquid carbon dioxide phase, and a gaseous carbon dioxide phase. The aqueous phase containing the aromatic components but no caffeine is removed through discharge valve 44 and utilized for rearomatization of the decaffeinated tea in a later step.

Figure 1:
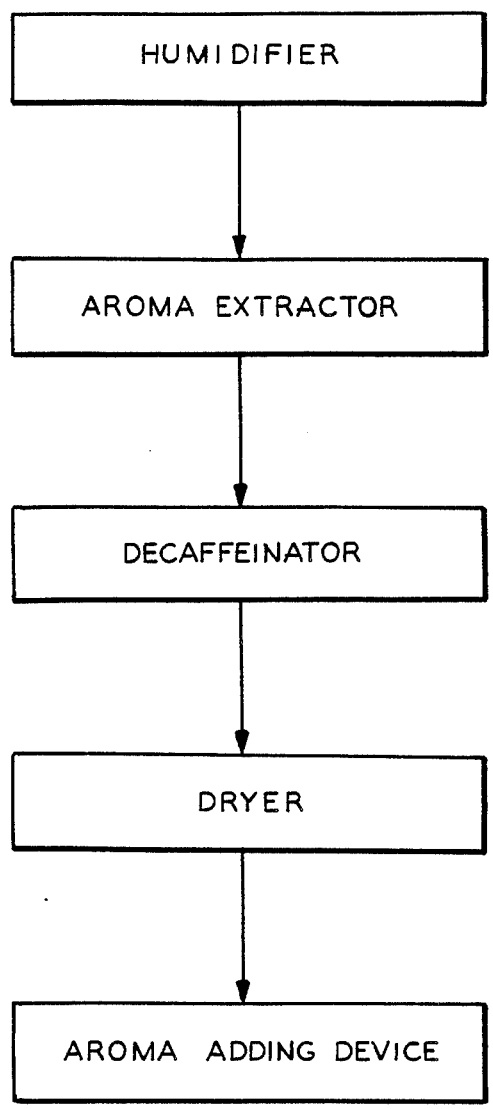
FIG. 1 is a schematic diagram illustrating the process steps of the present invention.
Figure 5A:
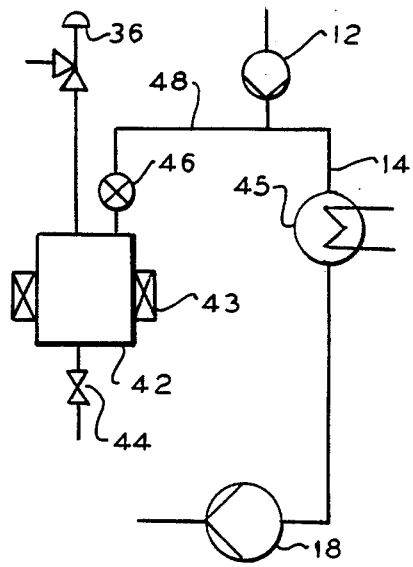
FIGS. 5a and 5b show two arrangements for different modes of reestablishing the pressure of the carbon dioxide after pressure reduction in the aroma separation step.

In one modification of this embodiment, the liquid carbon dioxide is evaporated by heating by heating device 43 and is passed through a condenser 45 (shown in FIG. 5a) and reintroduced into high pressure line 14.

Figure 5B:
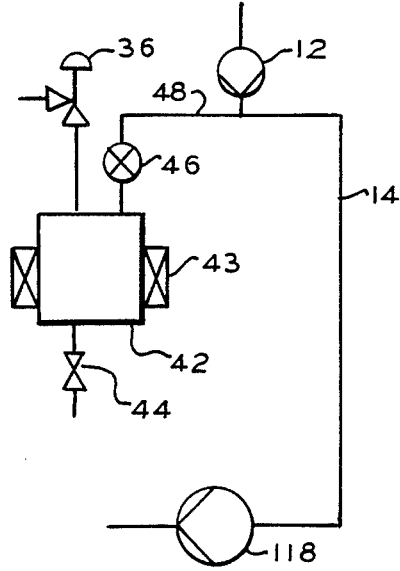

Alternatively, the evaporated carbon dioxide is passed to a compressor 118 (shown in FIG. 5b) which, after compression, again introduces the carbon dioxide into the cycle.

It will of course be clear to those in the art that the important step in both of these recyling modes is the evaporation step, so that the recycled carbon dioxide does not carry any aroma material, hence, is enabled to absorb the maximum amount from the mixed batch of tea.

Contemporaneously with the foregoing cycle, the decaffeination is carried out in the second circuit. This second circuit operates under isobaric conditions. In the operation of this circuit during the first cycle, valves 72 and 64 are open and valves 84, 88, 94 and 98 are closed. Thus, the carbon dioxide introduced into said second circuit through second input pump 52 will flow into the entire system to a predetermined pressure level. Circulation pump 62 is then activated, whereby the carbon dioxide passes through tank 66 which contains damp dearomatized tea. The carbon dioxide solvent in thus circulated into the caffeine absorber 56 which has previously been charged, either with activated carbon or a suitable ion exchanger, for the removal of caffeine.

Figure 6:
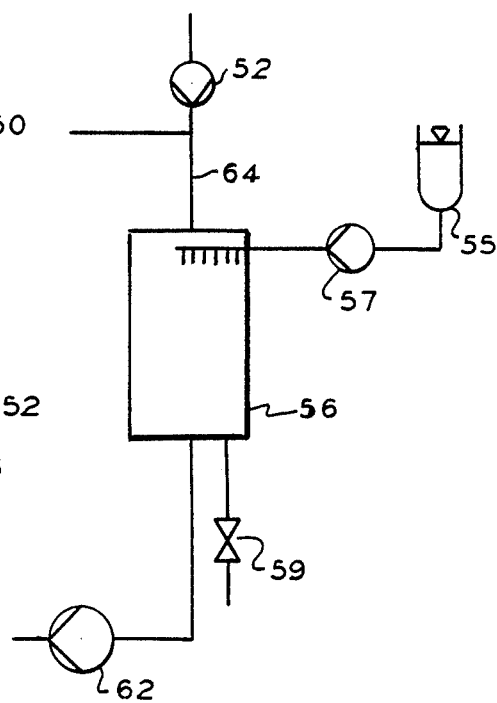
FIG. 6 shows an arrangement for an alternate mode of carrying out the decaffeination by means of a washing step.

In an alternative mode shown in FIG. 6, absorber 56 may be a washing tank where water is pressed into the carbon dioxide stream containing caffeine by a pump 57. The aqueous wash in removed from the system via discharge valve 59. The water pressed in from reservoir 55 by pump 57 may contain a complexing agent, e.g., a solution of tanning agents, forming a precipitate with caffeine. This mode of operation is more effective than washing out the caffeine by water alone.

When the predetermined amount of aroma has been removed from the first processing tank and similarly, a predetermined amount of caffeine has been removed from the second processing tank, the operation goes into the second cycle as shown in FIG. 3b. In this cycle, after closing the appropriate valves, tank 66 is taken out of the system and is replaced with a similar tank 166 containing fresh tea, moistened to the predetermined level. First processing tank 28 is left in place. Valves 26, 32, 64 and 72 are closed and valves 84, 88, 94 and 98 are opened. The effect of this rearrangement is to place the second processing tank 166 in tothe aroma extraction circuit which will operate as described hereinabove and the now dearomatized tea in the first processing tank 28 into the caffeine removal circuit which, again, is operated as previously described. Thereby the decaffeination is carried out in the same pressure vessel utilized for the dearomatization, i.e. the dearomatized tea need not be subjected to any decharging and recharging procedure for subsequent decaffeination. When the predetermined degree of aroma and caffeine removal have been reached, valves 84 and 88 are closed, first processing tank is disconnected from the system and replaced with a similar tank 128, again containing fresh humidified tea.

It will be noted that tank 166 now contains dearomatized tea and original tanks 66 and 28 contain dearomatized and decaffeinated tea, which can be processed as described hereinbelow. The system is now ready to recommence the two-cycle operation as described hereinabove. It will be understood by those skilled in the art that tanks 66 and 28 can be replaced by fresh tanks as the progress of the operation proceeds.

Figure 4:
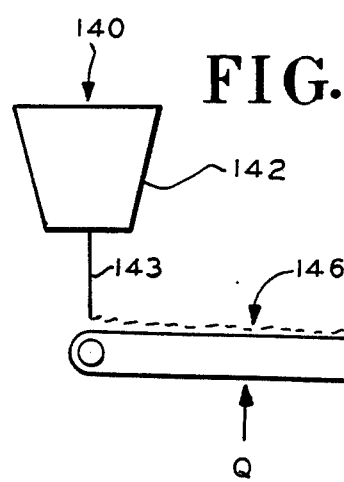
FIG. 4 is a schematic diagram of showing the drying and rearomatizing steps.

The apparatus for the final step is illustrated in FIG. 4 and comprises a hopper means 142 comprising a discharge means 143 issuing onto a continuous heated belt 144. The belt is oriented to provide a discharge into a mixing tank 152 provided with mixing means 154 and discharge means 156.

In the operation of the final step, the moist dearomatized, decaffeinated tea 140 is discharged into hopper 142 from first and second process tanks 28, 66, etc. The moist tea then passes through discharge means 143 to provide a layer 146 on belt 144 where it is dried by the application of a predetermined amount of heat (Q) by rising the temperature of the tea to about 40° to 80° C. and is discharged into mixing tank 152 wherein it is agitated while the blend of aromas 150 obtained from aroma tank 42, are added thereto.

The exact process conditions for carrying out the extraction of the aroma fraction and the removal of the caffeine will depend upon the nature of the tea to be processed. It is preferred that prior to the actual processing step, the conventionally obtained dry tea is humidified to a point where the humidified tea contains between 10 and 50%, preferably about 10 to 25% and especially 12 to 15% by weight (based upon wetted material) of water. In the aroma extraction step, the moist tea is subjected to carbon dioxide extraction at a pressure of between about 60 to about 150, suitably about 90 to about 110 bar at a temperature of between about 20° to about 70° C., suitably between about 50 to about 60° C. The exact range will depend on the tea utilized. The extraction conditions are chosen to dissolve the aroma but to prevent any caffeine from being dissolved. The amount of carbon dioxide utilized in this step will of course vary, but it has been found that between about 10 to about 30 kg. of carbon dioxide/kg. of air-dried tea may be utilized. While the extraction may be carried out in the lower end of this range, namely between about 10 and about 15 kg. of carbon dioxide/kg. of tea, it is preferred to operate in the higher end of the range, namely, utilizing between about 20 to about 30 kg./kg. of tea.

In the decaffeination circuit, the carbon dioxide may be utilized in the pressure range of from about 150 to about 500 bar, suitably from about 250 to about 350 bar, at a temperture which may range between about 10° to about 100° C., most suitably from about 60° to about 70° C. Again, the amount of carbon dioxide will vary. When purification is carried out utilizing activated carbon as the caffeine removal agent, it has been found useful to utilize between about 250 to about 500 kg., most suitably between about 300 to about 350 kg. of carbon dioxide/kg. of air-dried tea treated. It will be understood by those skilled in the art that while it is preferred to remove the caffeine from the carbon dioxide solvent under isobaric conditions by adsorption on carbon, separation can also be effected by reduction of density of the solution by means of reduction of pressure and/or rise of temperature (U.S. Pat. No. 4,167,589).

When operating the dearomazation step in the lower region of the moisture range it may become necessary, prior to the decaffeination step, to make up for the water losses caused by removing the aqueous aroma suspension/solution from aroma separator tank 42. If this is the case, fresh water is introduced in the carbon dioxide circuit by a high-pressure pump (not shown), in order to re-establish at least the required minimum of 10% of water content in the tea to be decaffeinated. On the other hand, using a low moisture content may make it possible to dry the decaffeinated tea within the pressure vessel used for decaffeination. For this purpose, under the operating conditions of the first cycle mode (FIG. 3a), dry carbon dioxide is flown through the decaffeinated tea, preferably under the pressure and temperature conditions of the antecedent decaffeination, while the water is removed from the carbon dioxide in separator tank 42.

While the art discloses a prejudice against the stability of tea aroma in water (EU-PS 0 050,482, column 1, lines 41–43), it has been found that when utilized in the process of the present invention, the aqueous aroma suspension is sufficiently stable to impart a fresh flavor to the dried tea when said is impregnated with it, in accordance with the procedures of the present invention.

While it is preferred to rearomatize the tea by adding the aqueous extract to it as described hereinabove, an alternate mode may also be employed. The aroma containing extract may be microencapsulated in accordance with procedures well known in the art and the thus obtained microcapsules mixed with the decaffeinated, dearomatized, dried tea, as described hereinabove.

In a sensorial test, samples of the tea were decaffeinated according to the above-mentioned known processes an compared to untreated tea and to tea which had been decaffeinated according to the invention. The tea used was "Orange Broken". Five tea tasters judged the tea in accordance with "J. Schormuller, Handbook of Food Chemistry, Volume VI, Springer-Verlag, 1970". The judgments were rated according to a scale of grades from 1 to 5; the untreated tea was attributed the highest grade of 1.

| Method of Decaffeination | Grade |
|---|---|
| None (untreated tea) | 1 |
| According to the invention | 1.5 |
| According to DE-PS 21 27 642 | 3 |
| According to DE-PS 26 37 197 | 2 |
| According to DE-OS 34 13 869 | 2 |
| According to DE-OS 34 15 844 | 3 |
| Decaffeinated with dichloromethane | 5 |
| Decaffeinated with ethyl acetate | 5 |

The ratings show that tea decaffeinated according to the invention was preferred to all others. It was particularly surprising to find that there was hardly any different in taste between the untreated tea and the tea which had been treated according to the invention.

The ratings show that tea decaffeinated according to the invention was preferred to all others. It was particularly surprising to find that there was hardly any difference in taste between the untreated tea and the tea which had been accordin to the invention.

We claim:

1. In a process for the production of an aromatic decaffeinated tea comprising the steps of
   (a) charging the tea to be treated to a pressurizable vessel
   (b) dearomatizing the tea by treatment with carbon dioxide at a pressure of from about 60 to about 150 bar at a temperature of from about 20° to about 70° C.;
   (c) separating the carbon dioxide from the tea, reducing the pressure of the carbon dioxide and separating therefrom an aroma containing fraction;
   (d) decaffeinating the tea which has been dearomatized in accordance with step (b) by treating said dearomatized tea with carbon dioxide at a pressure of from about 150 to about 500 bar at a temperature of from about 10° to about 100° C. in the presence of moisture;
   (e) separating said moist, caffeine containing carbon dioxide from the tea and releasing the carbon dioxide from said caffeine containing extract;
   (f) drying the decaffeinated tea; and
   (g) restoring the aroma by addding to said decaffeinated and dried tea the aroma fraction isolated in step (c);
   the improvement comprising raising the water content of the tea of step (b) to about 10 to 50% by weight of said tea, whereby the aroma fraction of step (c) is obtained as a caffeine free aqueous suspension/solution and wherein step (d) is carried out in the same vessel utilized to step (b);
   after step (c), adding sufficient water to maintain the water content of the dearomatized tea at between 10 and 50% by weight of said tea; and
   restoring the aroma by adding said aqueous aroma fraction to the decaffeinated and dried tea at ambient pressure.

2. In a process of claim 1, carrying out the dearomatization step at a pressure of between 90 to about 110 bar.

3. In a process of claim 1, carrying out the aromatization step at a temperature of from about 50° C. to about 70° C.

4. In a process of claim 1, the improvement comprising raising the water content of the tea to 10 to 25%, relative to the weight of said wet tea.

5. In a process of claim 1, restoring the aroma by spraying the aqueous aroma containing fraction onto the dried tea.

6. In a process of claim 1, the steps of microencapsulating the aqueous aroma containing fraction and adding said microcapsules to said dry tea.

7. In a process of claim 1, the step of releasing the carbon dioxide from the caffeine containing extract by reducing the pressure thereon.

8. In a process of claim 1, the step of removing the carbon dioxide from the caffeine containing extract by contacting said extract with a caffeine absorbing material.

9. In a process of claim 8, utilizing activated carbon or ion exchangers as the absorbents for caffeine.

10. In a process of claim 1, releasing the carbon dioxide from the moist caffeine containing extract by washing the caffeine out of said extract.

11. In a process of claim 1, releasing the carbon dioxide from the moist caffeine containing extract by adding a caffeine precipitating agent to said extract.

12. In a process of claim 1, drying the decaffeinated tea by causing dry carbon dioxide to stream through the tea.

13. In a process of claim 4, the improvement comprising raising the water content of the tea to between 12 to 15%.

* * * * *